United States Patent [19]
Cheng

[11] Patent Number: 5,189,664
[45] Date of Patent: Feb. 23, 1993

[54] LISTENER ECHO CANCELLATION

[75] Inventor: King Y. Cheng, Penn Valley, Calif.

[73] Assignee: Silicon Systems, Inc., Tustin, Calif.

[21] Appl. No.: 657,535

[22] Filed: Feb. 19, 1991

[51] Int. Cl.⁵ .............................................. H04J 3/10
[52] U.S. Cl. .................................. 370/32.1; 379/410; 379/411
[58] Field of Search ............... 370/32.1, 32, 31, 29; 381/93, 94; 379/410, 411, 408, 402, 406, 407, 409, 388; 375/57, 58, 34, 51, 52, 67, 76, 83, 81, 122, 85, 26, 103; 364/724.1; 333/18, 28 R

[56] References Cited

U.S. PATENT DOCUMENTS

| | | | |
|---|---|---|---|
| 4,805,215 | 2/1989 | Miller | 370/32.1 |
| 4,813,073 | 3/1989 | Ling | 370/32.1 |
| 4,868,874 | 9/1989 | Takatori et al. | 370/32.1 |
| 4,887,257 | 12/1989 | Belloc et al. | 370/32.1 |
| 4,887,258 | 12/1989 | Belloc et al. | 370/32.1 |
| 4,896,318 | 1/1990 | Kokubo et al. | 370/32.1 |
| 4,982,428 | 1/1991 | Agazzi et al. | 370/32.1 |
| 4,987,569 | 1/1991 | Ling et al. | 370/32.1 |

Primary Examiner—Douglas W. Olms
Assistant Examiner—Dang Ton
Attorney, Agent, or Firm—Hecker & Harriman

[57] ABSTRACT

A bulk delay and a finite impulse response (FIR) filter with adjustable coefficients to approximate the listener echo in a transmission line. The present invention subtracts the approximated echo from the line signal. By implementing a phase lock loop, the circuit compensates for phase changes in the listener echo brought on during additional round trips through the telephone line. Cancelling the echo permits the slicer to make a better decision about which constellation point is actually being represented.

15 Claims, 4 Drawing Sheets

QAM Constellation

QPSK Constellation

LISTENER ECHO CANCELLATION

FIELD OF THE INVENTION

This invention relates to the field of listener echo cancellation for modems.

BACKGROUND ART

During the course of computer operation, it is often desirable to transmit information between computers at different locations. To accomplish this, a signal transportation means must be available. One readily available means for signal transportation is a telephone line. However, telephone lines do not provide for digital communication. Therefore, a means for translating a serial digital signal sent from a computer port into an analog signal suitable for telephone line transport, and for providing the reverse operation, must be used. The standard method is to use a modulation scheme in which the digital information is used to modulate a carrier signal. A modem (modulator/demodulator) is used to accomplish the modulation of outgoing signals and the demodulation of incoming signals.

A number of transmission schemes are utilized to maximize the amount of information that can be transmitted in a given bandwidth. Two popular modulation schemes are known as quadrature phase shift key (QPSK) and quadrature amplitude modulation (QAM) (in which the phase and amplitude of a modulated sine wave carrier signal are utilized to convey information). QPSK signals are generated by shifting the phase of a carrier wave by $\pi/2$ radians. A QPSK signal has one of four possible phases, each phase representing one of four binary pairs (00, 01, 10, 11). The QPSK wave is defined by $$S_i(t) = \cos(\omega_c t + \theta_i) = a_i \cos(\omega_c t) - b_i \sin(\omega_c t).$$

Transmission of this type is often called quadrature transmission, with two carriers in phase quadrature to one another (cosine $\omega_c t$ and sine $\omega_c t$) transmitted simultaneously over the same channel.

An example of a QPSK transmission scheme is illustrated in FIG. 4A. Referring to FIG. 4A, the horizontal axis, corresponding to $a_i$, is called the "in phase" axis. The vertical axis, corresponding to $b_i$, is called the "quadrature" axis. The signal points in the four quadrants of FIG. 4A represent a signal "constellation." The constellation points are matched such that the points $\{(1,1); (-1, 1); (-1, -1); (1, -1)\}$ each represent one of the four bit-patterns: (00, 01, 10, 11).

By assigning multiple values to $a_i$ and $b_i$, the multilevel symbol signalling scheme known as quadrature amplitude modulation (QAM), is generated. The QAM scheme involves multi-level amplitude modulation applied independently to each of the quadrature carriers. Thus, a 16 state constellation, such as that illustrated in FIG. 4B, may be generated. Each point of the QPSK modulation scheme of FIG. 4A now represents four points in the QAM scheme, so that a total of 16 constellation points are defined in the QAM constellation. The general QAM signal is given by:

$$S_i(t) = r_i \cos(\omega_c t + \theta_i) = a_i \cos(\omega_c t) - b_i \sin(\omega_c t)$$

where $a_i$ and $b_i$ can be $-3$, $-1$, 1 or 3. The amplitude $r_i$ is given by the appropriate combinations of $(a_i, b_i)$. A phase detector/amplitude level detector combination is then used to extract digital information. Thus a data scheme suitable for telephone line transmission is described.

A dial-up switched telephone network is illustrated in FIG. 5. Terminal A 500 is coupled to modem A 501. Modem A 501 is coupled to hybrid A 503 by a two-wire channel 502. Hybrid A 503 is coupled to hybrid B 505 by the main four-wire channel 504. One pair of wires 504A is used to transmit from subscriber A to subscriber B. The other pair 504B is used to transmit from subscriber B to subscriber A. Hybrid B 505 is coupled to modem B 507 by a local two-wire channel 506. Modem B 507 is coupled to terminal B 508

The two-wire channels 502 and 506 are the communication link between the subscribers and their local central telephone office. At the central telephone office, the two-wire channels are linked to four-wire channels, called trunk lines, by a 4/2 wire -converting hybrid. These hybrids are tuned to isolate the transmit and receive channels, but the isolation is often insufficient due to mismatching of the hybrid and telephone line impedances. Consequently, some of the transmitted signal leaks back to the receiving line causing an echo in the signal.

An echo signal which originates from the local transmitter of subscriber A, is bounced off hybrid B, and echoed back to the receiver of subscriber A is called "talker" echo. Talker echo cancellation is accomplished in the prior art by taking a sample of the input signal from line 509 and using adaptive filter techniques to cancel the talker echo in the receiver signal.

A system for talker echo cancellation is described in Proakis' and Manolakis' book, *Introduction to Digital Signal Processing*, MacMillan 1988 pages 864–868. The signal to be transmitted is passed through an adaptive filter. The filter output is then used to subtract the talker echo from the incoming "receive" signal.

An echo signal which originates from the local transmitter of subscriber A, is reflected off hybrid B, then reflected off hybrid A to end up at subscriber B, is called "listener" echo. This echo represents the transmitted signal passed through one additional round trip of the telephone line.

In the transmission of signals through telephone lines, modem performance is inhibited by this unwanted "listener echo." When a signal is sent from a transmitter, the receiver obtains not only the transmitted signal, but an added echo signal, caused by a reflection of the signal through the telephone line. If the trunk loss of the telephone circuit is high and the 4/2 wire converting hybrids at both ends of the circuit are properly designed, this "listener echo" is small and can be neglected. This is the case especially for modems operating at lower speeds, where tolerance for disturbances are relatively high. However, for higher speed modems such as the V.32BIS, where the highest data rate can reach 14,400 bits per second, the tolerance for any disturbances is much reduced. Frequently, the telephone circuits are such that listener echo makes satisfactory operation through these channels impossible. (The TIA TR-30.3 subcommittee has proposed a number of test channels among which channels #9 and #11 reflect severe listener echoes.)

The addition of the listener echo to the incoming signal moves the signal a distance from the appropriate constellation point as represented in FIG. 4B by the point $(a_i', b_i')$. For example, an echo signal could be of the form:

$$e_i(t) = \alpha a_{i-d}\cos(\omega_c t) - \alpha b_{i-d}\sin(\omega_c t)$$

where $\alpha$ is the attenuation of the two 4/2 wire converting hybrids and the round trip trunk line, and $a_{i-d}$ and $b_{i-d}$ represent the constellation point of one round trip delay earlier. The resulting signal is:

$$S_i(t) = (a_i + \alpha a_{i-d})\cos(\omega_c t) - (b_i + \alpha b_{i-d})\sin(\omega_c t).$$

So the point $(a_i', b_i')$ is really $(a_i + \alpha a_{i-d}, b_i + \alpha b_{i-d})$. In reality, there is an extra term for prior echoes and a round trip phase shift for each. The function becomes:

$$S_i'(t) = \sum_{r=0}^{\infty} \alpha^r e^{jr\theta} \{a_{i-rd}\cos(\omega_c t) - b_{i-rd}\sin(\omega_c t)\}$$

where r is the respective number of delays for that term and $\theta$ is the round trip phase shift.

A slicer or quantizer is used within the circuit to choose which constellation point the point $(a_i', b_i')$ is supposed to represent. The slicer then outputs the ideal signal for that constellation point. In the QPSK scheme, the constellation points are relatively far spaced, with only one point to each quadrant. In the QAM scheme, there are a number of points to each quadrant, for example, for 14,400 bps, there are 32 points in each quadrant, so they are more closely packed. Thus, in a QAM scheme, the echo can create an error significant enough for the slicer to mistake the point $(a_i', b_i')$ for an inappropriate constellation point.

Modems have two modes of operation. They are half duplex mode and full duplex mode. In half duplex mode the telephone line is being used exclusively to either send or receive data at one time. In full duplex mode, the telephone line is being used to both send and receive data simultaneously. A common way to reduce the echoes, either "talker" or "listener" in half duplex mode, is to enable the echo suppressor of the line. However, in full duplex mode, that approach is not practical. This is because the received signal will be unduly attenuated, providing yet another problem.

For most modems, the start-up sequence does not include a measurement of the round trip signal delay. In this instance, the listener echo is ignored by modem designers, and the assumption is made that listener echo will be of no consequence for the majority of telephone circuits. This assumption is false in the case of very fast modems like V.32 and V.32BIS modems. These devices have a high sensitivity to disturbances, thus, the listener echo cannot be ignored. Fortunately, these devices are equipped with a mechanism that measures the round trip delay for far end talker echo. This measurement also represents the round trip delay for the listener echo.

SUMMARY OF THE INVENTION

The listener echo cancellation means of the present invention employs a finite impulse response (FIR) filter with adjustable coefficients to approximate the listener echo in a telephone line. The cancellation means then subtracts the approximated echo from the line signal. By implementing a phase correction loop, the circuit compensates for phase changes in the listener echo brought on during additional round trips through the telephone line. Cancelling the echo permits the slicer to make better decisions, about which constellation point is actually being represented.

The first block of the listener echo cancellation means is an adder used to subtract the approximated echo signal from the line signal. The output of the adder is received by a slicer (quantizer) which makes an estimate of what the correct signal should be. This "correct" signal is then inputted into a bulk delay equivalent to a telephone line round trip delay. This delayed signal is then passed through an adaptive FIR filter. This filter then outputs the approximated echo to the first adder block where the approximated echo is used to cancel the echo in the line signal. In addition, the "correct" signal from the slicer is subtracted from the output of the adder, thereby producing an error signal. This, error signal is then multiplied by the conjugate of the approximated echo signal; the imaginary part of this product is then passed through a low pass loop filter to obtain the phase difference. This phase difference value is then used for two purposes. The phase difference is provided to a cosine/sine table and used to phase shift the approximated echo, and also, the negative phase difference is provided to a cosine/sine table and used to phase shift the error signal. The phase shifted error signal is used in a fuction that adjusts the coefficients of the adaptive FIR filter.

DETAILED DESCRIPTION OF THE INVENTION

Figure 1:
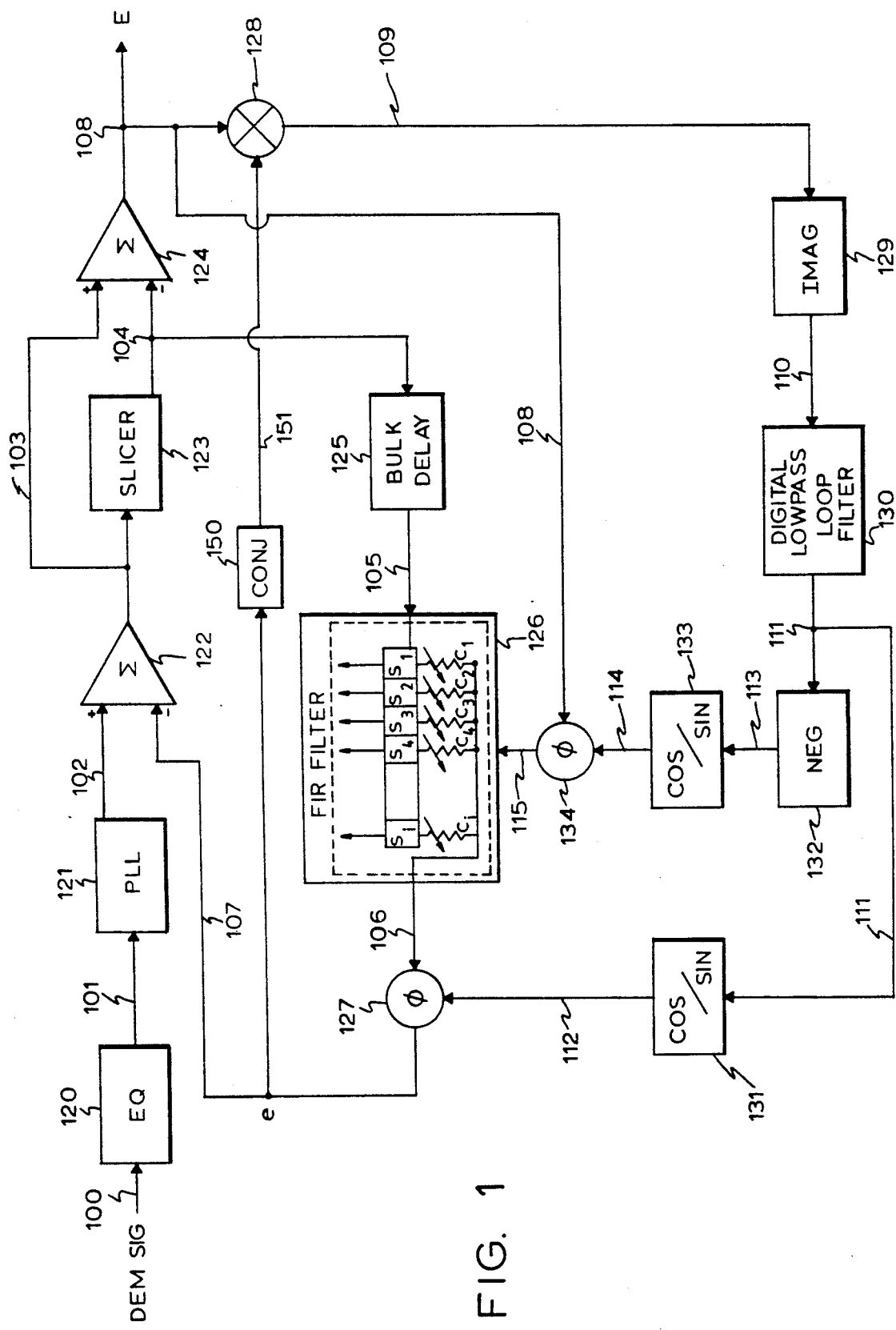
FIG. 1 is a block diagram illustrating the preferred embodiment of the listener echo cancellation means of the present invention.

A listener echo cancellation means for V.32 modems is described. In the following description, numerous specific details, such as transmission rates, transmission schemes, etc., are described in detail in order to provide a more thorough description of the present invention. It will be apparent, however, to one skilled in the art, that the present invention may be practiced without these specific details. In other instances, well-known features have not been described in detail in order not to unnecessarily obscure the present invention.

In the present invention, an adaptive FIR filter is integrated with a phase lock loop to form a means capable of cancelling out the listener echo signal. As a result, modems, such as the V.32 and V.32BIS modems, which use QAM or QPSK transmission schemes, have increased functionality.

In the present invention, a slicer receives an input signal from a remote transmitter and outputs a corresponding "ideal" signal. This ideal signal is passed through a bulk delay equivalent to the telephone line round trip delay and is then passed through a FIR filter with adaptive coefficients. The output of the FIR filter is an estimate of the listener echo. This estimate is phase corrected and subtracted from the input signal.

The ideal signal is subtracted from the input signal to provide an error signal which is then multiplied by the conjugate of the estimated echo. The imaginary part of this product is passed through a digital loop filter into a cosine/sine table where the phase error is used to correct the FIR filter output. Also, the negative of the loop filter output is passed into another cosine/sine table to shift the error signal into phase with the echo. The phase shifted error is used in a circuit which controls the coefficients of the FIR filter.

In the preferred embodiment, the present invention is used in the receiver of a V.32 or like modem. The preferred embodiment of the present invention is illustrated in FIG. 1, which is a block diagram of the listener echo cancellation means.

The demodulated signal 100 from the receiver line of the modem is inputted to equalizer (EQ) 120 whose output 101 is coupled to phase lock loop (PLL) 121. The output 102 of PLL 121 is provided as one input to adder 122. Output 103 of adder 122 is coupled to the input of slicer 123 and the positive terminal of adder 124. The output 104 of slicer 123 is coupled to the negative terminal of adder 124 and the input of bulk delay 125. The output 105 of delay 125 is coupled to FIR filter 126 whose output 106 is in turn coupled to phase shifter 127. The error signal (E) 108 is outputted from adder 124 and inputted into multiplier 128 and phase shifter 134. The approximated echo signal 107 is outputted from phase shifter 127 and inputted into conjugate block 150 and the negative terminal of adder 122. Output 151 of conjugate block 150 is provided to one input of multiplier 128. The output 109 of multiplier 128 is coupled to imaginary component separator (IMAG) 129. The output 110 of IMAG 129 is passed through digital loop filter 130 whose output 111 is coupled to cosine/sine table 131 and sign inverter (NEG) 132. Cosine/sine table 131 outputs echo phase signal 112 to phase shifter 127. NEG 132 outputs signal 113 to cosine/sine table 133 which is coupled to phase shifter 134 by line 114. Phase shifter 134 is coupled to FIR filter 126 by line 115.

Unlike the talker echo canceller which runs off of a transmitter clock, the timing of the listener echo canceller is controlled by a receiver clock, so that operation coincides with the received signal.

In operation, the circuit of FIG. 1 receives the demodulated, two dimensional, complex valued symbol on line 100 at equalizer 120. The EQ 120 corrects the signal for intersymbol interference. The equalized signal 101 is then passed through PLL 121 to maintain phase coherence.

The output 102 of PLL 121 is passed through adder 122 where echo approximation 107 is subtracted from signal 102 to produce a corrected signal 103. Corrected signal 103 is provided to the slicer (quantizer) 123.

The slicer 123 can be implemented in many ways. For example, if the data signal were transmitted in a trellis-encoded form, the slicer 123 would be implemented as a trellis decoder, providing the decoded output as the ideal signal. In this fashion, an input signal with an added echo is quantized to one of many discrete values that represent ideal symbols. In addition, the slicer or trellis decoder may be implemented via a microprocessor or other suitable processing means. Other coding schemes can be implemented, and a processing means is provided to determine ideal signal output from actual input.

The slicer 123 estimates the most probable ideal constellation point from the received complex signal 103 and provides this ideal constellation point as output 104. This ideal signal 104 is inputted into bulk delay 125. V.32 modems are designed with a mechanism to measure the transmission line round trip delay for talker echo cancellation. This same delay is used in the present invention as bulk delay 125. After ideal signal 104 is delayed the equivalent of one round trip, the delayed signal 105 is provided to FIR filter 126.

Figure 2:
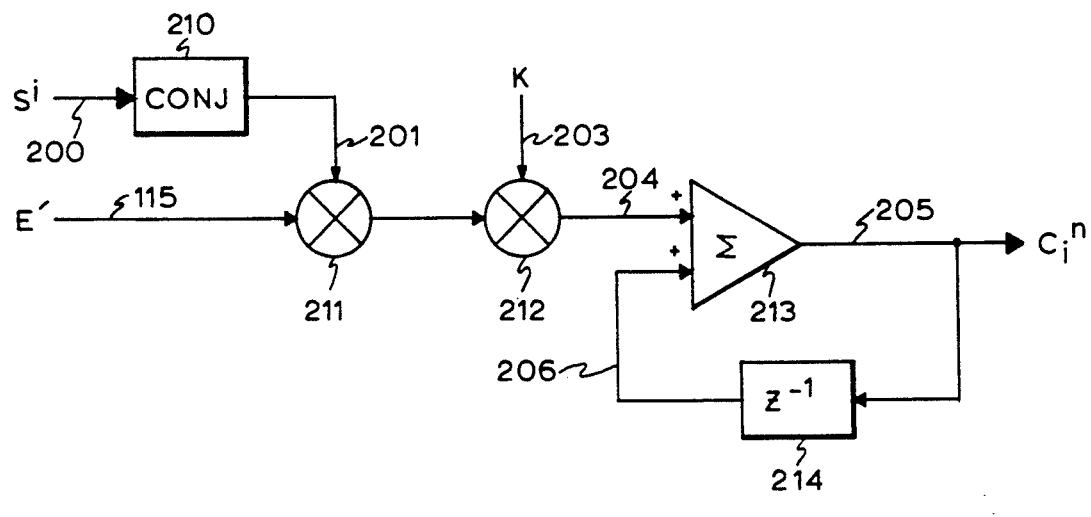
FIG. 2 is a block diagram illustrating the control block that updates the FIR filter coefficients in the listener echo cancellation means of the present invention.

FIR filter 126 is implemented as a tapped delay line with adaptive tap coefficients $C_1, C_2, \ldots C_m$. This filter is used to approximate the listener echo by the equation:

$$e = \sum_{i=1}^{m} C_i S_i$$

where e represents the approximated (estimated) echo signal, $C_i$ represents the $i^{th}$ tap coefficient, and $S_i$ represents the $i^{th}$ delayed signal. The approximated echo signal is provided as output 106. The coefficient adjustment circuit, not shown in FIG. 1, is illustrated in FIG. 2.

The echo signal 106 is passed through phase shifter 127 where it is corrected for the round trip phase shift of the listener echo. The final echo approximation signal 107 is outputted from phase shifter 127 and provided to the negative terminal of adder 122 for echo cancellation, as mentioned earlier. This final echo approximation signal 107 is subtracted from the new input signal at adder 122.

Corrected signal 103 is provided to the positive terminal of adder 124, and ideal signal 104 is provided to the negative terminal. Adder 124 then computes the difference between these two signals and outputs the resulting signal, which represents the error (E), on line 108.

The error signal 108 (E) is multiplied by the conjugate of the approximated echo signal 151, at multiplier 128. The product 109 of these two signals is provided to IMAG block 129, which separates the complex product into real and imaginary components and outputs the imaginary part on line 110. This imaginary component 110 is proportional to the sine of the phase difference between the true listener echo in the received signal and the approximated listener echo signal 107 and, thus, since $\sin \phi = \phi$ for small $\phi$, it can be used to represent the phase error of the true echo signal over a round trip with respect to the approximated echo signal.

The phase error signal 110 is provided to digital low-pass loop filter 130, which serves to attenuate the higher frequency signal remaining from product 109 and leaves a low frequency signal proportional to the phase error.

The phase error signal 111 is provided to cosine/sine look-up table 131, providing outputs that are the sine and cosine of the phase error signal 111. The output 112 of the cosine/sine table 131 is provided to phase shifter 127, providing the phase correction for the echo approximation signal. This connection completes a phase lock loop in the circuit.

Since both the talker echo and the listener echo traverse the same path and are submitted to the same disturbances, this PLL can be shared by both of the cancellers. In a conventional talker echo canceller, the associated PLL has to be updated very slowly because of the presence of the received signal in the error. Since the magnitude of the received signal is much larger than the echo signal, the gain values must be reduced to prevent divergence. This reduces the bandwidth of the PLL since the bandwidth is a function of the gain values. In the present invention, the error used in the adaptive algorithm is free from any received signal, allowing the gain values to be increased so that the PLL bandwidth will be wide enough to track phase jitters at relatively high frequency, such as 60 Hz or 120 Hz.

The NEG block 132 also receives as input the phase error signal 111, changing it to the negative of its value and providing this signal to the cosine/sine look-up table 133. Table 133 provides the appropriate phase correction signal to phase shifter 134. Phase shifter 134 receives the error (E) signal 108 as an input and modifies its phase in the opposite manner of phase shifter 127. The new signal (E') 115 is provided to the FIR filter block to be implemented in the coefficient adjustment circuit.

Figure 3:
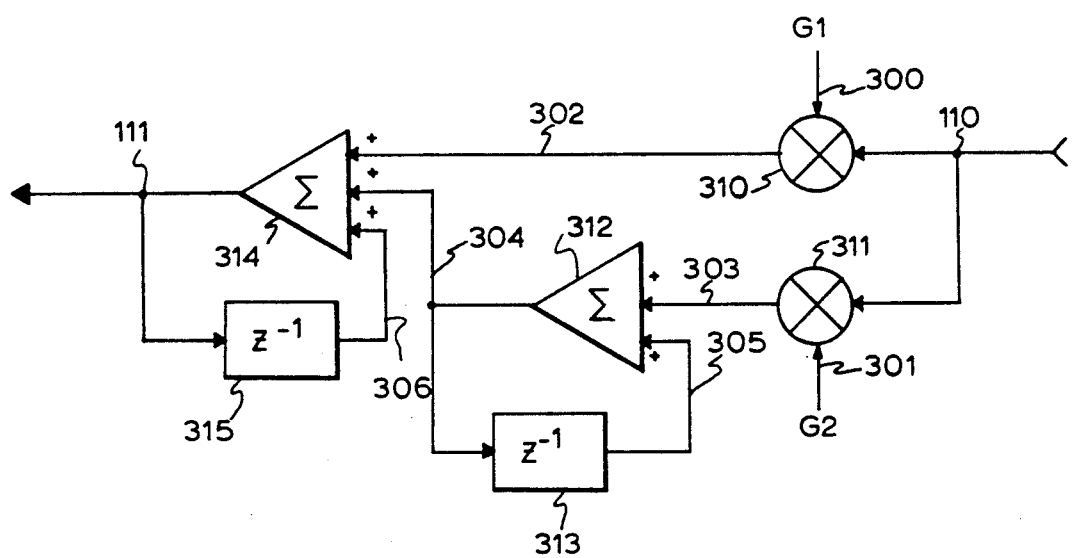
FIG. 3 is a block diagram illustrating the second order digital loop filter in the listener echo cancellation means.
Figure 4B:
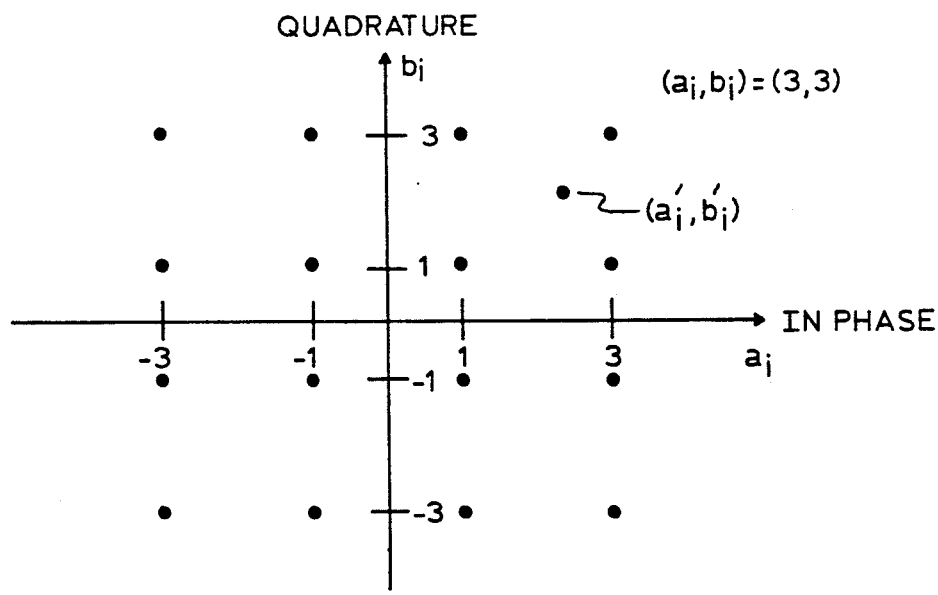
FIG. 4B illustrates a sixteen point QAM constellation.
Figure 4A:
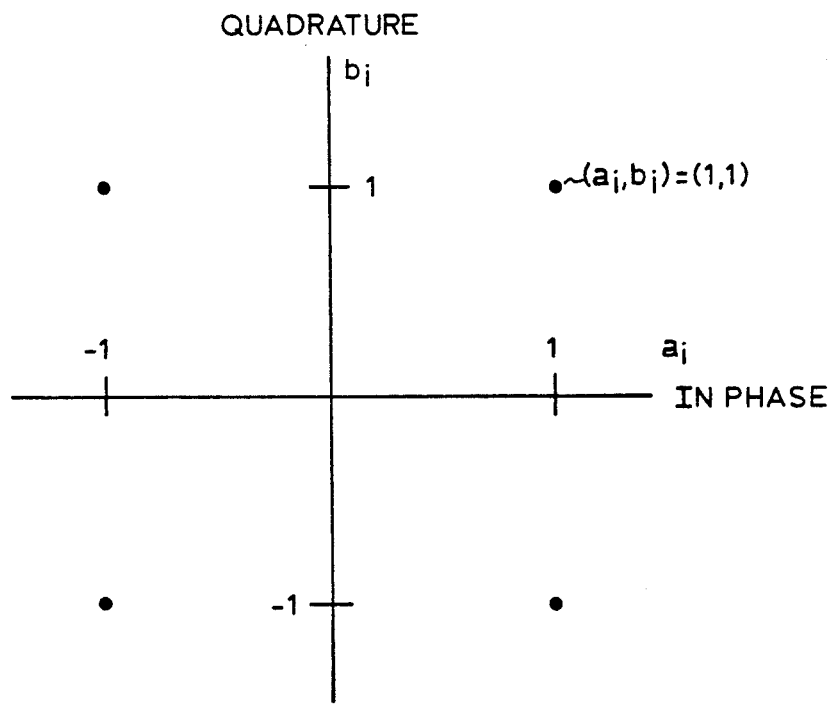
FIG. 4A illustrates a four point QPSK constellation.
Figure 5:
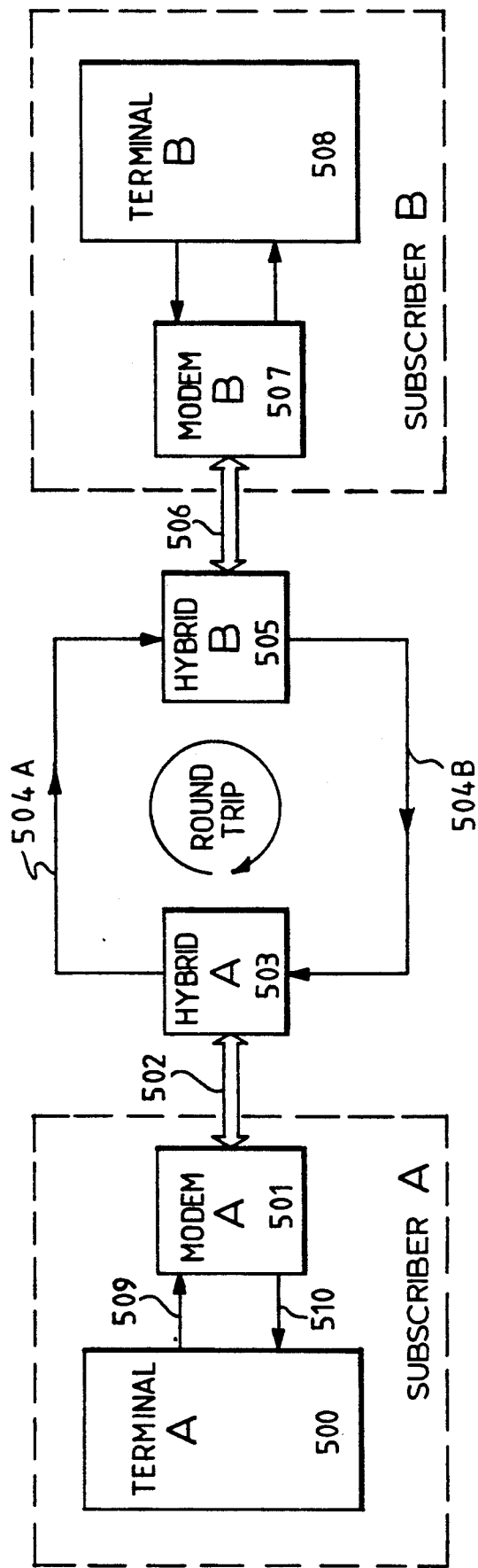
FIG. 5 illustrates a dial-up switched telephone network.

In FIG. 3, the digital loop filter 130 is illustrated. Signal 110 is coupled to gain multipliers 310 and 311. First order gain G1 300 is coupled to multiplier 310 and second order gain G2 301 is coupled to multiplier 311. The output of multiplier 310 is coupled to the input of adder 314. The output of multiplier 311 is coupled to adder 312. The output of adder 312 is coupled to the input of adder 314 and also to delay 313, which is coupled in feedback fashion to the input of adder 312. The output of adder 314 is provided to line 111 and also to delay 315, which is coupled to the input of adder 314.

The operation of the digital loop filter 130 is described by the closed loop transfer function, $$H(Z) = \frac{(Z^{-1})[G_1(1 - Z^{-1}) + G_2]}{(1 - Z^{-1})^2 + (Z^{-1})[G_1(1 - Z^{-1}) + G_2]}$$

which is a second order phase lock loop with frequency characteristics controlled by the gain values G1 and G2. The phase lock loop, being second order, is capable of compensating for any frequency offset.

The coefficient adjustment circuit for the adaptive FIR filter 126 is illustrated in FIG. 2. The adjustment circuit is built to control one coefficient only, so there must be one such circuit for every tapped delay. The delayed signal ($S_i$) 200 is passed through CONJ block 210. This block changes a complex signal into its complex conjugate ($S_i^*$). This conjugate signal ($S_i^*$) 201 is outputted to multiplier 211 where it is multiplied by the phase adjusted error signal (E') 115. This product is passed into another multiplier 212 where it is multiplied by a small gain (K) 203. The three-term product (KE'$S_i^*$) 204 is passed to one input of adder 213. The output ($C_i^n$) 205 is passed through delay 214 which is coupled to the second input of adder 213 i$^n$ feedback fashion. The output 205 of adder 213 is the coefficient value ($C_i^n$) for the $i^{th}$ tapped delay. This circuit satisfies the following equation:

$$C_i^{(n)} = C_i^{(n-1)} + KE'S_i^*.$$

Thus, the coefficient $C_i^n$ is equal to its value from previous sample plus an update term, KE'$S_i^*$. For the $i^{th}$ term of the tapped delay line, $$C_i^{(n)}S_i = C_i^{(n-1)}S_i + KE'|S_i|^2.$$

The $C_i^{(n-1)}S_i$ term represents the weighted signal of the previous sample. The KE'$|S_i|^2$ term, or update term, is proportional to the adjusted error 115. $|S_i|^2$ represents a positive, real term giving larger error correction for larger signals. The K term has a small value (K<<1) to maintain slow error correction. This serves to prevent divergence of the system. As E' goes to zero, the coefficient assumes its previous value.

This listener echo cancellation means is capable of cancelling echoes in V.32 or like modems in which a measurement of the round trip delay time is made available to the circuit. Due to its adaptive structure and its associated phase lock loop characteristics, it is able to reduce the disturbances caused by the listener echo, providing a high reliability data signal to the slicer, thus reducing the bit error rate.

Thus a means for the cancellation of listener echo in V.32 modems has been described.

I claim:

1. A circuit for cancelling listener echo in an input signal comprising:
    receiving means for receiving said input signal and for generating an ideal signal;
    difference generating means coupled to said input signal and said ideal signal for generating an error signal;
    first phase shifter means coupled to said error signal for generating a phase adjusted error signal based on a first phase correction signal;
    bulk delay means coupled to said ideal signal for generating a delay signal;
    first filter means coupled to said delay signal, said first filter means storing said delay signal, said first filter means generating a first echo signal based on at least one previously stored delay signal;
    second phase shifter means coupled to said first echo signal for generating a second echo signal based on a second phase correction signal;
    cancelling means coupled to a demodulated signal and said second echo signal for subtracting said second echo signal from said demodulated signal to generate said input signal;
    phase correction means coupled to said error signal and said second echo signal for generating said first and second phase correction signals.

2. The circuit of claim 1 wherein said receiving means comprises a quantizing means.

3. The circuit of claim 1 wherein said difference generating means comprises an adder with a positive and negative input, said positive input coupled to said input signal, said negative input coupled to said ideal signal, and said adder providing said error signal.

4. The circuit of claim 1 wherein said bulk delay means approximates telephone line round trip delay.

5. The circuit of claim 1 wherein said first filter means comprises a tapped delay line.

6. The circuit of claim 5 wherein said tapped delay line has a plurality of coefficients $C_1$, $C_2$, $C_3$, etc. that are updated on each occurrence of said input signal.

7. The circuit of claim 6 wherein said tapped delay line further includes a plurality of coefficient adjustment means equal in number to the number of coefficients.

8. The circuit of claim 7 wherein said coefficient adjustment means comprises:
    multiplying means coupled to the conjugate of an $i^{th}$ delay signal ($S_i$) and said phase adjusted error signal for providing a first product signal;
    scaling means coupled to said first product signal and scale factor (K) for providing an update signal;

summing means coupled to said update signal and a previous baud coefficient signal ($C_i^{(n-1)}$) for generating said $i^{th}$ coefficient ($C_i$);

storing means coupled to said $i^{th}$ coefficient for generating said previous baud coefficient signal.

9. The circuit of claim 8 wherein the coefficients are updated according to:

$$C_i^{(n)} = C_i^{(n-1)} + KE'S_i^*$$

where $C_i^{(n)}$ is the updated $i^{th}$ coefficient; $C_i^{(n-1)}$ is the previous baud coefficient; K is a scaling constant; E' is the phase adjusted error signal; and $S_i^*$ is the conjugate of the $i^{th}$ delay signal.

10. The circuit of claim 6 wherein said first echo signal is generated by the superposition of tapped delay signals according to:

$$e = \sum_{i=1}^{m} C_i^{(n)} S_i$$

where e is said first echo signal; m is the total number of tapped delays; $C_i^{(n)}$ is said updated coefficient; and, $S_i$ is said $i^{th}$ delay signal.

11. The circuit of claim 1 wherein said phase correction means comprises:

multiplying means coupled to a conjugate of said second echo signal and said error signal for generating a first phase difference signal;

a separation means coupled to said first phase difference signal for providing the imaginary portion of said first phase difference signal;

a second filter means coupled to said imaginary portion of said first phase difference signal for filtering out high frequency terms, and providing a second phase difference signal;

a first converting means coupled to said second phase difference signal for generating said second phase correction signal;

a sign change means coupled to said second phase difference signal for generating a negative phase difference signal;

a second converting means coupled to said negative phase difference signal for generating said first phase correction signal.

12. The circuit of claim 11 wherein said second filtering means comprises a second order digital lowpass loop filter.

13. The circuit of claim 11 wherein said first and second converting means comprise individual cosine/sine look-up tables.

14. A method for cancelling listener echo in a transmission line comprising:

quantizing an input signal to provide an ideal signal;

subtracting said ideal signal from said input signal to provide an error signal;

delaying said ideal signal by an equivalent of one round trip through the transmission line to provide a delay signal;

applying said delayed signal to an adaptive FIR filter to provide a filter output;

phase shifting said filter output by the application of a phase correction signal to provide an echo approximation;

subtracting said echo approximation from said input signal;

phase shifting said error signal to provide a phase shifted error signal;

utilizing said phase shifted error signal to update said adaptive FIR filter.

15. The method of claim 14 wherein said phase correction signal is provided by a phase correction method comprising:

multiplying said error signal by the conjugate of said echo approximation to provide a complex product signal comprised of a real product signal and an imaginary product signal;

taking out said imaginary product signal to provide an estimated phase error signal;

filtering-out high-frequency components of said estimated phase error signal to provide a proportional phase error signal;

applying said proportional phase error signal to a cosine/sine table to generate a phase correction signal;

applying said phase correction signal to said filter output.

* * * * *